(12) United States Patent
Uno

(10) Patent No.: US 6,940,258 B2
(45) Date of Patent: Sep. 6, 2005

(54) CHARGING APPARATUS OF BICYCLE DYNAMO

(75) Inventor: Kouji Uno, Osaka (JP)

(73) Assignee: Shimano Inc., Osaka (JP)

( * ) Notice: Subject to any disclaimer, the term of this patent is extended or adjusted under 35 U.S.C. 154(b) by 151 days.

(21) Appl. No.: 10/678,176

(22) Filed: Oct. 6, 2003

(65) Prior Publication Data

US 2004/0075420 A1 Apr. 22, 2004

(30) Foreign Application Priority Data

Oct. 18, 2002 (JP) ........................................ 2002-304048

(51) Int. Cl.[7] .............................................. H01M 10/46
(52) U.S. Cl. ...................................................... 320/137
(58) Field of Search .............................. 320/104, 117, 320/121, 127, 137, 166, DIG. 34; 290/1 R, 1 A, 50; 322/1

(56) References Cited

U.S. PATENT DOCUMENTS 3,808,514 A * 4/1974 Wesemeyer ................. 320/137

6,418,041 B1 * 7/2002 Kitamura .................... 363/125
2004/0051506 A1 * 3/2004 Kitamura

FOREIGN PATENT DOCUMENTS

| JP | 5-252745 A | 9/1993 |
| JP | 2002-262473 A | 9/2002 |

* cited by examiner

*Primary Examiner*—Edward H. Tso
(74) *Attorney, Agent, or Firm*—Shinjyu Global IP Counselors, LLP

(57) ABSTRACT

A charging apparatus of a bicycle dynamo is configured and arranged to charges a voltage generated by a dynamo GE and comprises a first capacitor C1, a second capacitor C2, a first diode D1 and a third diode D3. The second capacitor C2 is supplied and charged by the dynamo output during the negative half-cycle of the dynamo output. During the positive half-cycle of the dynamo output the first diode D1 supplies the electrical charge that was charged in the second capacitor C2 to the first capacitor C1. During the positive half-cycle of the dynamo output the third diode D3 supplies the dynamo output to the first capacitor C1 when the charging voltage of the second capacitor C2 is equal to or less than a specified voltage.

19 Claims, 3 Drawing Sheets

CHARGING APPARATUS OF BICYCLE DYNAMO

BACKGROUND OF THE INVENTION

1. Field of the Invention

The present invention relates to a charging apparatus of a bicycle dynamo. In particular, the present invention relates to a charging apparatus that is charged by a voltage generated by a bicycle dynamo to allow efficient and stable charging when a dynamo output changes without a steady travel speed.

2. Background Information

In recent years, some bicycles are equipped with an automatic transmission. An electrically-driven transmission has been used as the automatic transmission of the bicycles. These types of bicycle are usually equipped with a dynamo for driving the electrically-driven transmission as well as a charging system for charging a storage device from a voltage generated by the dynamo. Because the voltage generated by the dynamo is an alternating current voltage, half-wave rectification or full-wave rectification is performed in the charging system.

However, a voltage generated from the dynamo for bicycle fluctuates, i.e., increases or decreases, depending on the travel speed of the bicycle. For example, when the bicycle is traveling at a low speed, a voltage generated by the dynamo is small. In such a case, there is a chance that a sufficient voltage cannot be supplied to electrical components of the bicycle, such as an electrically driven transmission, and thus, there is a risk that these components will malfunction.

In view of the above, Japanese Laid-Open Patent Publication No. 2002-262473 discloses a voltage-doubling rectifier circuit used to charge an electric power from a dynamo and supply stable electrical power to electrical components of a bicycle.

Moreover, a charging apparatus of a bicycle dynamo is preferably configured and arranged to obtain stable electrical power using a simple circuit. FIG. 5 shows one example of the simple circuit configuration of a conventional half-wave voltage-doubler circuit. More specifically, a charging circuit with the half-wave voltage-doubler circuit shown in FIG. 5 basically comprises a capacitor C1 used as a charging element, a pair of diodes D1 and D2 connected between a dynamo GE for a bicycle and the capacitor C1, and a capacitor C2 connected between a connection point of the diodes D1 and D2 and a second terminal of the dynamo GE.

In the circuit shown in FIG. 5, the capacitor C2 is charged by the output of the dynamo GE through the diode D2 during the negative (−) half-cycle of the output of the dynamo GE. During the inverse half-cycle, the electrical charge stored in the capacitor C2 is supplied to the capacitor C1 through the diode D1 to charge the capacitor C1. This configuration makes it possible to obtain an output voltage V1 of the capacitor C1 that is higher than the peak voltage of the dynamo GE.

However, since the output frequency in the dynamo GE changes depending on the speed at which the bicycle is traveling, it is difficult to determine an optimum capacity for the capacitor C2. Depending on the capacity of the capacitor C2, an electrical charge at the opposite polarity will be stored in the capacitor C2 during the inverse half-cycle while the capacitor C2 is discharging. In such a case, charging the capacitor C2 during the next half-cycle will require more time, and thus, charging the capacitor C2 cannot be performed efficiently.

In view of the above, it will be apparent to those skilled in the art from this disclosure that there exists a need for an improved charging apparatus for a dynamo for a bicycle. This invention addresses this need in the art as well as other needs, which will become apparent to those skilled in the art from this disclosure.

SUMMARY OF THE INVENTION

One object of the present invention is provide a charging apparatus for a bicycle dynamo that efficiently and stably charges a capacitor when the output of the dynamo changes when the travel speed of the bicycle is not stable.

Another object of the present invention is to provide a charging apparatus of dynamo for bicycle that efficiently and stably charges a capacitor using a simple circuit configuration.

In order to achieve the above objects, a charging apparatus of a bicycle dynamo is provided that basically comprises a charging element, a half-wave charging element, a first charging circuit, and a second charging circuit. The charging element is configured and arranged to store electrical energy generated by the dynamo. The half-wave charging element is configured and arranged to be charged with an electrical charge supplied by an output of the dynamo during a first half-cycle of the output of the dynamo. The first charging circuit is configured and arranged to supply the electrical charge stored in the half-wave charging element to the charging element during a second half-cycle of the output of the dynamo. The second charging circuit is configured and arranged to supply the output of the dynamo to the charging element when a voltage stored in the half-wave charging element is equal to or less than a prescribed voltage during the second half-cycle of the output of the dynamo.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
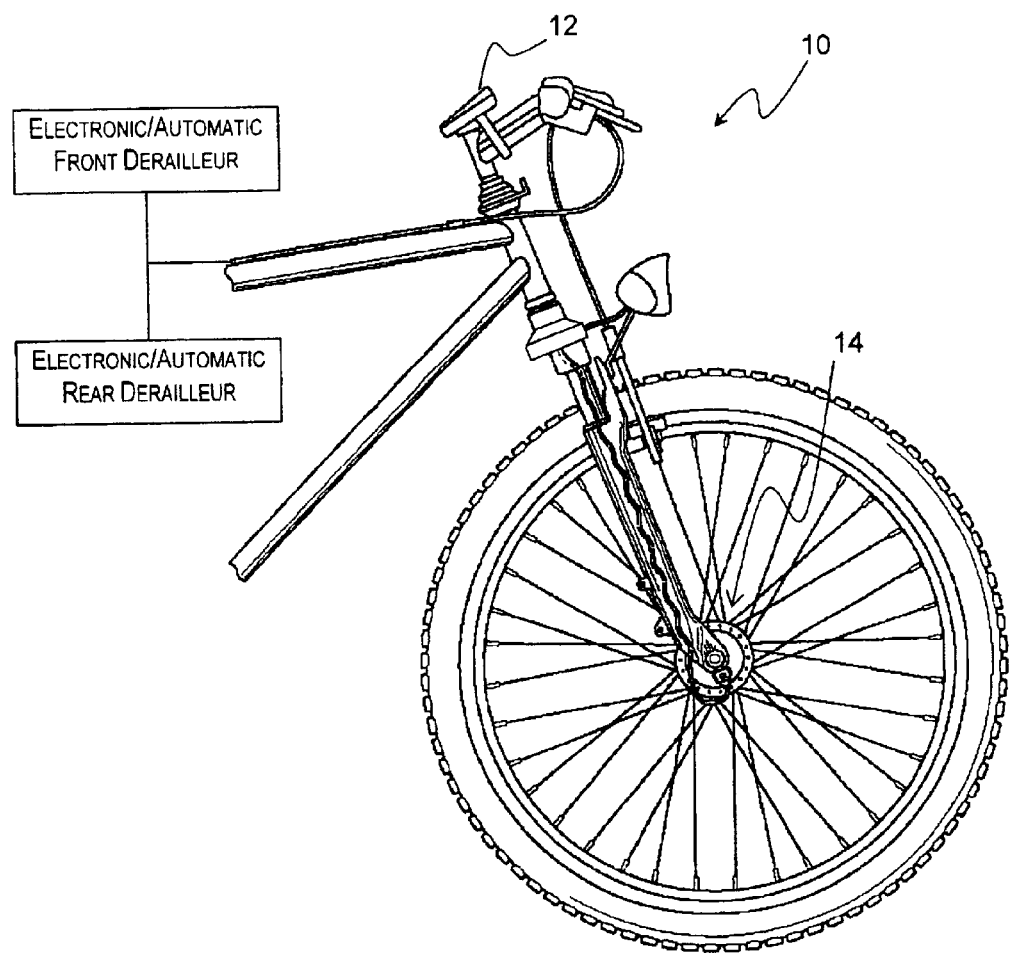
FIG. 1 is a partial side elevational view of a bicycle equipped with a cycle computer, a front bicycle dynamo hub, and a charging apparatus that is operatively and electrically coupled to the cycle computer and the front bicycle dynamo hub in accordance with a first embodiment of the present invention.
Figure 2:
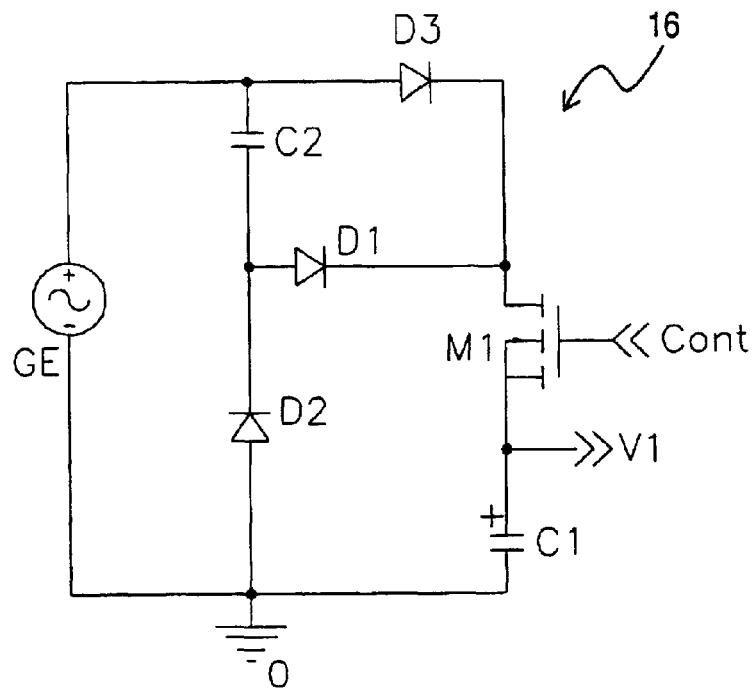
FIG. 2 is an electrical schematic diagram of a charging apparatus for a bicycle dynamo in accordance with the first embodiment of the present invention.

Referring initially to FIGS. 1 and 2, a front portion of a bicycle 10 is illustrated in FIG. 1 that is equipped with a cycle computer 12 and a front bicycle dynamo hub 14, one of which preferably includes a charging apparatus 16 that is illustrated in FIG. 2 in accordance with a first embodiment of the present invention. The charging apparatus 16 is operatively and electrically coupled to the cycle computer 12 and the front bicycle dynamo hub 14. The charging apparatus 16 is built into the cycle computer 12 and/or the front bicycle dynamo hub 14, or alternatively, the charging apparatus 16 is housed as a separate component that is operatively and electrically coupled to the cycle computer 12 and the front bicycle dynamo hub 14. The cycle computer 12 is operatively and electrically coupled to an electronic/automatic front derailleur 18 and an electronic/automatic rear derailleur 20 to electronically/automatically shift the bicycle 10.

The cycle computer 12, the front bicycle dynamo hub 14, the electronic/automatic front derailleur 18 and the electronic/automatic rear derailleur 20 are conventional components that are well known in the art, except for the addition of the charging apparatus 16 of the present invention. Since these components are well known in the art, the precise construction of these components will not be discussed or illustrated in detail herein.

FIG. 2 shows an electrical schematic diagram of the charging apparatus 16 of the first embodiment. The charging apparatus 16 of the present invention is configured and arranged to be charged from the output voltage of a dynamo GE (generator) of the front bicycle dynamo hub 14. Thus, the dynamo GE is preferably a hub dynamo that is installed inside the front wheel of a bicycle. The charging apparatus 16 of the present invention basically comprises a first capacitor C1 (first electrical storage device), a second capacitor C2 (second electrical storage device), a first diode D1, a second diode D2 and a third diode D3. The first capacitor C1 preferably constitutes a charging element. The second capacitor C2 preferably constitutes a half-wave charging element that is charged during one half-cycle (first half-cycle) of the output of the dynamo GE. The diodes D1 and D3 preferably constitute first and second charging circuits. The second diode D2 is configured and arranged to charge the second capacitor C2 from the voltage of the dynamo GE during the first half-cycle of the output of the dynamo GE.

One end of the second capacitor C2 is connected to the dynamo GE, and the other end of the second capacitor C2 is connected to the first capacitor C1 through the first diode D1. The anode of the first diode D1 is connected to the second capacitor C2, and the cathode of the first diode D1 is connected to the first capacitor C1. The anode of the second diode D2 is connected to the dynamo GE and the cathode of the second diode D2 is connected to the second capacitor C2 and to the anode of the first diode D1. The anode of the third diode D3 is connected to the dynamo GE and the cathode of the third diode D3 is connected to the first capacitor C1.

The operation of the charging apparatus 16 of the present invention will now be described. It is assumed that the capacitors C1 and C2 are initially empty. First, during the negative or first half-cycle of the output of dynamo GE, the current flows over the following path (1): the dynamo GE→the second diode D2→the second capacitor C2. This current flow results in charging of the second capacitor C2. The voltage across the second capacitor C2 reaches approximately the dynamo output peak voltage of 0.6 V. Thus, in the charging apparatus 16 of the first embodiment, the output of the dynamo GE charges the second capacitor C2 through the second diode D2 during a first half-cycle of the output of the dynamo GE.

During the positive or second half-cycle of the output of the dynamo GE and when the charged voltage in C2 is over the prescribed voltage, the current flows over the following path (2): the second capacitor C2→the first diode D1→the first capacitor C1 (this is the first charging circuit). In other words, the first diode D1 is open and the third diode D3 is closed. This current flow results in charging of the first capacitor C1 from the electrical charge or energy stored in the second capacitor C2. Moreover, during the positive or second half-cycle of the output of the dynamo GE and when the charged voltage in C2 is over the prescribed voltage, the current from the dynamo GE charges the second capacitor C2.

During the positive or second half-cycle of the output of dynamo GE and when the charged voltage in C2 is lower than the prescribed voltage, the current flows over the following path (3): the dynamo GE→the third diode D3→the first capacitor C1 (this is the second charging circuit). In other words, the first diode D1 is now closed and the third diode D3 is now opened. This current flow results in charging of the first capacitor C1 from the electrical charge or energy generated by the dynamo GE.

Thus, during a second half-cycle of the output of the dynamo GE, the electrical charge that was previously charged in the second capacitor C2 is first supplied to the first capacitor C1. If the electrical charge of the second capacitor C2 is discharged during the second half-cycle below a specified voltage, then the output of the dynamo GE is supplied to the first capacitor C1 through the diode D3. In other words, the first capacitor C1 is initially charged by the electrical charge stored in the second capacitor C2 during the initial part of the second half-cycle of the output of the dynamo GE. However, when the speed at which the bicycle is traveling is low, there is a chance that the charging voltage of the second capacitor C2 may be discharged below a specified voltage during the second half-cycle. In such a case, the charging apparatus 16 of the present invention is configured and arranged to supply the output of the dynamo GE to the first capacitor C1 through the diode D3 when the charging voltage of the second capacitor C2 is equal to or less than a specified voltage. Accordingly, with the charging apparatus 16 of the present invention, an even higher charging voltage can be obtained and stabilized.

Moreover, in the first embodiment of the present invention, during the first half-cycle, the output of the dynamo GE is supplied to the second capacitor C2 through the second diode D2 to charge the second capacitor C2. Then, in the second half-cycle, the electrical charge of the second capacitor C2 is supplied to the first capacitor C1 through the first diode D1. Moreover, during the second half-cycle of the output of the dynamo GE, when the voltage charged in the second capacitor C2 is equal to or less than the prescribed voltage, the output of the dynamo GE is supplied to the first capacitor C1 through the third diode D3. Accordingly, loss can be reduced using this simple circuit configuration and an efficient charge can be performed by charging through one diode at once.

In addition, the charging apparatus 16 of the present invention further comprises a FET (Field Effect Transistor) or a transistor M1 that is configured and arranged to cut off the supply of voltage to the first capacitor C1 when the charging voltage of the first capacitor C1 is equal to or more than a predetermined value. The transistor M1 preferably constitutes a switch circuit. The transistor M1 is connected between the cathodes of the first and third diodes D1 and D3 and the first capacitor C1. A fixed control voltage is applied to a gate terminal of the transistor M1 to turn on the transistor M1. As is well known for such transistors, if the electric potential at the gate terminal of the transistor M1 is higher than that at the source by more than a predetermined level, the transistor M1 switches on. When the electric potential difference between the gate terminal and the source of the transistor M1 becomes equal to or less than a prescribed electric potential difference, the transistor M1 will turn off. Thus, overcharging of the capacitor C1 can be prevented. In other words, the transistor M1 is configured and arranged to cut off connections between first and third diodes D1 and D3 and the first capacitor C1 when the charging voltage of the first capacitor C1 is equal to or more than the predetermined value. Accordingly, overcharging of the first capacitor C1 can be prevented, and thus, the electrical components of the bicycle can be protected.

Figure 3:
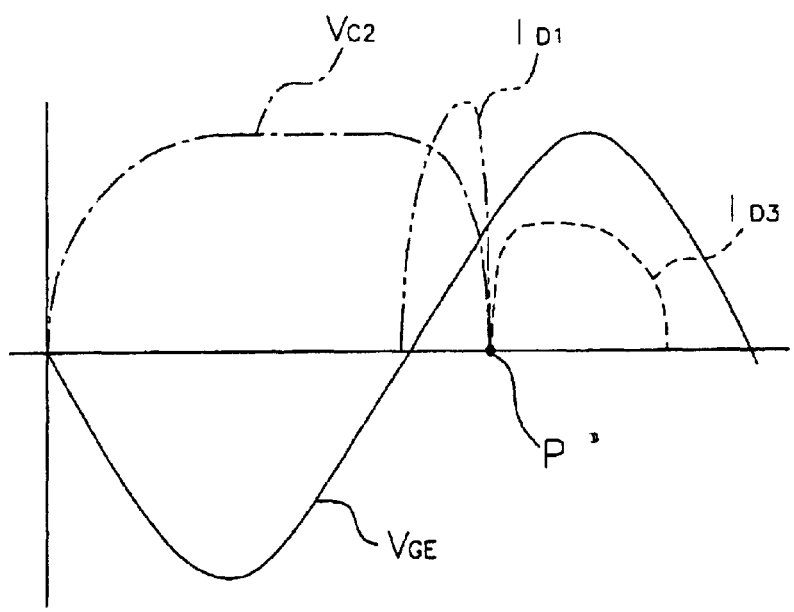
FIG. 3 is a diagrammatic chart showing voltage and current waveforms to describe the operation of the charging apparatus for the bicycle dynamo in accordance with the first embodiment.

Referring now to the waveform diagram shown in FIG. 3, the operation of the charging apparatus 16 in accordance with the first embodiment will be described referring to these waveforms. The waveform diagram of FIG. 3 shows examples of voltage and current waveforms with the above explained configuration of the charging apparatus 16 of the first embodiment. More specifically, FIG. 3 shows an output voltage waveform of the dynamo GE ($V_{GE}$:solid line), a voltage waveform at both ends of the second capacitor C2 ($V_{C2}$:dash-dot line), a current waveform that flows through the first diode D1 ($I_{D1}$:dash-dot-dot line), and a current waveform that flows through the third diode D3 ($I_{D2}$:broken line). The abscissa is the time axis.

When the output of the dynamo GE is negative, (the first half-cycle of the output of the dynamo GE), the output of the dynamo GE is supplied to the second capacitor C2 through the second diode D2 to charge the second capacitor C2. The voltage at both ends of the second capacitor C2 at this time is shown as a waveform $V_{C2}$ in FIG. 3.

Then, when the output of the dynamo GE changes to positive, (second half-cycle of the output of the dynamo GE), the electrical charge stored in the second capacitor C2 during a previous cycle when the output was negative (the first half-cycle) is supplied to the first capacitor C1 through the first diode D1. The current $I_{D1}$ that flows through the first diode D1 at this time is waveform $I_{D1}$ shown in FIG. 3.

Moreover, during the second half-cycle, when the electrical charge of the second capacitor C2 is discharged and the electric potential difference at both ends of the first diode D1 becomes equal to or less than approximately 0.6 V, the first diode D1 will turn off and the current $I_{D1}$ will become zero (0). In this timing, the second capacitor C2 is charged at a polarity opposite to the previous cycle and the electric potential difference at both ends of the third diode D3 will become equal to or more than 0.6 V. Therefore, the third diode D3 will turn on. In other words, the first diode D1 turns off and the third diode D3 turns on at point P of the timing of FIG. 3. The waveform of the current $I_{D3}$ that flows through the third diode D3 is as shown in FIG. 3. Thus, the output of the dynamo GE is supplied to the first capacitor C1 through the third diode D3.

Accordingly, the first capacitor C1 is efficiently and stably charged by the output of the dynamo GE. Moreover, as mentioned above, a fixed control voltage is also applied to the gate terminal of the transistor M1. When the electric potential difference between the gate terminal and the source of the transistor M1 becomes equal to or less than a prescribed electric potential difference, the transistor M1 will turn off. Thus, overcharging of the capacitor C1 can be prevented.

SECOND EMBODIMENT

Figure 4:
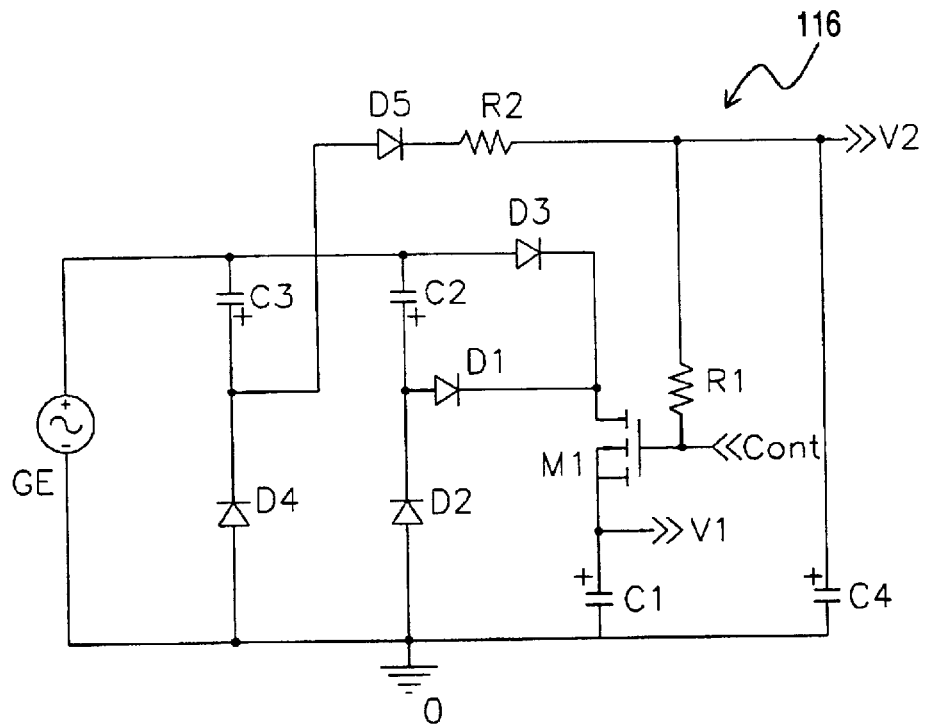
FIG. 4 is an electrical schematic diagram of a charging apparatus of for a bicycle dynamo in accordance with a second embodiment of the present invention.
Figure 5:
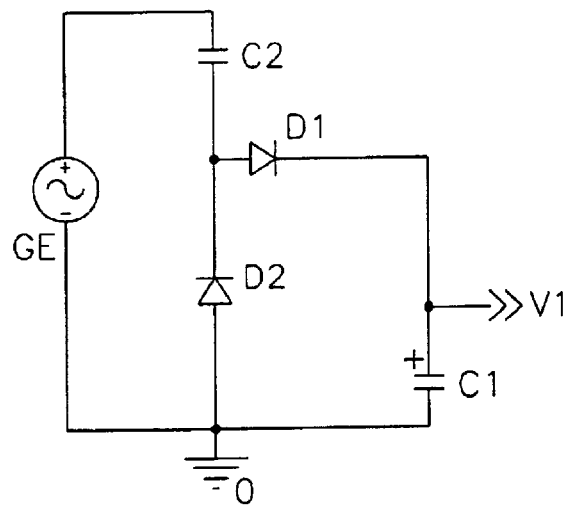
FIG. 5 is an electrical schematic diagram of a conventional charging apparatus for a bicycle dynamo.

Referring now to FIG. 4, a charging apparatus 116 of dynamo for bicycle in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 4 shows an electrical schematic diagram of a charging apparatus 116 in accordance with the second embodiment of the present invention. As seen in FIG. 4, the second embodiment of the present invention differs from the first embodiment in that the transistor M1 is provided with a switch drive circuit or a half-wave voltage doubler circuit that is configured and arranged to operate the transistor M1 by using the output of the dynamo GE. More specifically, the half-wave voltage doubler circuit is provided to turn on the transistor M1 when the voltage charged in the first capacitor C1 is not sufficient. Thus, since the transistor M1 is driven by the output of the dynamo GE, a separate power supply, such as a battery, is not required to operate the transistor M1.

For example, in the circuit of the first embodiment of the present invention explained above, the transistor M1 is required to be turned on in order to charge the first capacitor C1. In order to turn on the transistor M1, a control voltage is required be applied to the gate of the transistor M1. The control voltage is required to be equal to or higher than the sum of voltage $V_{C1}$ at both ends of the first capacitor C1 and the voltage required to turn on the transistor M1. However, when the voltage charged in the first capacitor C1 is not sufficient, a sufficient control voltage cannot be applied to the gate of the transistor M1, and thus, it is necessary to provide a separate power supply, such as a battery.

In the second embodiment of the present invention, the control voltage applied to the gate of the transistor M1 is produced by providing the half-wave voltage doubler circuit for switching, as seen in FIG. 4. More specifically, the half-wave voltage doubler circuit for switching basically comprises a fourth capacitor C4 (switching charging element), a third capacitor C3 (switching half-wave charging element), a pair of (fourth and fifth) diodes D4 and D5, and a pair of resistors R1 and R2. One end of the third capacitor C3 is connected to the dynamo GE and the other end is connected to the cathode of the fourth diode D4. The anode of the fourth diode D4 is connected to the dynamo GE. The fifth diode D5 is connected in the forward direction between the third capacitor C3 and the fourth capacitor C4. The resistor R2 is connected in series to the fifth diode D5. The resistor R1 is connected between the fourth capacitor C4 and the transistor M1.

Thus, in the charging apparatus 116 of the second embodiment, the output of the dynamo GE charges the third capacitor C3 during the first half-cycle of the output of the dynamo GE. In contrast, during the second half-cycle of the output of the dynamo GE, the electrical charge charged in the third capacitor C3 is supplied to the fourth capacitor C4. Thus, a stable switching voltage can be obtained using the output of the dynamo GE.

In order to turn ON the transistor M1 at this point, each of the specifications must be determined to satisfy the following Equation 1.

$$V_{C1} + V_{m1ON} + R_1 * I_{r1} \leq V_{C4} \quad \text{Equation 1}$$

In Equation 1, the voltage $V_{C1}$ is the voltage at both ends of the first capacitor C1, the voltage $V_{m1ON}$ is the voltage required to turn on the transistor M1, the resistance $R_1$ is the resistance value of the resistor R1, the current $I_{r1}$ is the current that flows through the resistor R1, and the voltage $V_{C4}$ is the voltage at both ends of the fourth capacitor C4.

Then, with the half-wave voltage double circuit for switching, the overcharging of the first capacitor C1 is prevented and the voltage V1 is stabilize by applying a control voltage $V_{CONT}$ that satisfies the following Equation 2 to the gate of the transistor M1.

$$V1 = V_{C1} = V_{CONT} = V_{m1ON} \quad \text{Equation 2}$$

Other circuit configurations of the charging apparatus 116 in accordance with the second embodiment are identical to the circuits of the first embodiment.

As described above, the present invention makes it possible to obtain a stable charging voltage using a circuit with a simple configuration even when using a dynamo for a bicycle that does not have a stable output voltage.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-304048. The entire disclosure of Japanese Patent Application No. 2002-304048 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A charging apparatus of a bicycle dynamo comprising:
   a charging element configured and arranged to store electrical energy generated by the dynamo;
   a half-wave charging element configured and arranged to be charged with an electrical charge supplied by an output of the dynamo during a first half-cycle of the output of the dynamo;
   a first charging circuit configured and arranged to supply the electrical charge stored in the half-wave charging element to the charging element during a second half-cycle of the output of the dynamo; and
   a second charging circuit configured and arranged to supply the output of the dynamo to the charging element when a voltage stored in the half-wave charging element is equal to or less than a prescribed voltage during the second half-cycle of the output of the dynamo.

2. The charging apparatus as set forth in claim 1, further comprising
   a switch circuit disposed between the first and second charging circuits and the charging element, the switch circuit being configured and arranged to disconnect the first and second charging circuits from the charging element when a voltage stored in the charging element is equal to or greater than a predetermined value.

3. The charging apparatus as set forth in claim 2, further comprising
   a switch drive circuit configured and arranged to operate the switch circuit by using the output of the dynamo.

4. The charging apparatus as set forth in claim 3, wherein the switch drive circuit comprises
   a switching charging element configured and arranged to supply a switching voltage to the switch circuit,
   a switching half-wave charging element configured and arranged to be charged with an electrical charge supplied by the output of the dynamo during one of the first and second half-cycles of the output of the dynamo, and a switching charging circuit configured and arranged to supply the electrical charge stored in the switching half-wave charging element to the switching charging element during the other of the first and second half-cycles of the output of the dynamo.

5. The charging apparatus as set forth in claim 4, wherein the first charging circuit includes a first diode connected between the half-wave charging element and the charging element.

6. The charging apparatus as set forth in claim 5, further comprising a second diode disposed between the half-wave charging element and the dynamo configured and arranged to supply the output of the dynamo to the half-wave charging element.

7. The charging apparatus as set forth in claim 6, wherein the second charging circuit includes a third diode connected between the dynamo and the charging element.

8. The charging apparatus as set forth in claim 1, wherein the first charging circuit includes a first diode connected between the half-wave charging element and the charging element.

9. The charging apparatus as set forth in claim 2, wherein the first charging circuit includes a first diode connected between the half-wave charging element and the charging element.

10. The charging apparatus as set forth in claim 3, wherein the first charging circuit includes a first diode connected between the half-wave charging element and the charging element.

11. The charging apparatus as set forth in claim 1, further comprising a second diode disposed between the half-wave charging element and the dynamo configured and arranged to supply the output of the dynamo to the half-wave charging element.

12. The charging apparatus as set forth in claim 2, further comprising a second diode disposed between the half-wave charging element and the dynamo configured and arranged to supply the output of the dynamo to the half-wave charging element.

13. The charging apparatus as set forth in claim 3, further comprising a second diode disposed between the half-wave charging element and the dynamo configured and arranged to supply the output of the dynamo to the half-wave charging element.

14. The charging apparatus as set forth in claim 4, further comprising a second diode disposed between the half-wave charging element and the dynamo configured and arranged to supply the output of the dynamo to the half-wave charging element.

15. The charging apparatus as set forth in claim 1, wherein the second charging circuit includes a third diode connected between the dynamo and the charging element.

16. The charging apparatus as set forth in claim 2, wherein the second charging circuit includes a third diode connected between the dynamo and the charging element.

17. The charging apparatus as set forth in claim 3, wherein the second charging circuit includes a third diode connected between the dynamo and the charging element.

18. The charging apparatus as set forth in claim 4, wherein the second charging circuit includes a third diode connected between the dynamo and the charging element.

19. The charging apparatus as set forth in claim 5, wherein the second charging circuit includes a third diode connected between the dynamo and the charging element.

* * * * *